(12) United States Patent
Mate

(10) Patent No.: US 11,064,453 B2
(45) Date of Patent: Jul. 13, 2021

(54) POSITION STREAM SESSION NEGOTIATION FOR SPATIAL AUDIO APPLICATIONS

(71) Applicant: Nokia Technologies Oy, Espoo (FI)

(72) Inventor: Sujeet S. Mate, Tampere (FI)

(73) Assignee: Nokia Technologies Oy, Espoo (FI)

( * ) Notice: Subject to any disclaimer, the term of this patent is extended or adjusted under 35 U.S.C. 154(b) by 147 days.

(21) Appl. No.: 15/355,404

(22) Filed: Nov. 18, 2016

(65) Prior Publication Data

US 2018/0146446 A1 May 24, 2018

(51) Int. Cl.
*H04L 29/06* (2006.01)
*H04W 64/00* (2009.01)

(52) U.S. Cl.
CPC ......... *H04W 64/00* (2013.01); *H04L 65/1006* (2013.01); *H04L 65/1069* (2013.01)

(58) Field of Classification Search
CPC  H04N 21/218; H04N 21/439; H04L 65/1006; H04L 65/1069; H04W 64/00
See application file for complete search history.

(56) References Cited

U.S. PATENT DOCUMENTS

| 5,674,003 A * | 10/1997 | Andersen | H04M 3/567 348/14.08 |
| 5,781,101 A * | 7/1998 | Stephen | G08B 25/016 340/286.01 |
| 5,890,061 A * | 3/1999 | Timm | G08B 25/016 455/404.2 |
| 6,363,324 B1 * | 3/2002 | Hildebrant | G01C 21/26 342/357.31 |
| 6,738,712 B1 * | 5/2004 | Hildebrant | G01C 21/26 701/431 |
| 6,856,807 B1 * | 2/2005 | Raith | G01S 19/34 455/434 |

(Continued)

FOREIGN PATENT DOCUMENTS

| CN | 101090555 A | 12/2007 |
| CN | 101860536 A | 10/2010 |

(Continued)

OTHER PUBLICATIONS

"MPEG Spatial Audio Coding for Broadcasting Applications", http://www.nrscstandards.org/nrsc/NRSCFiles/SSATG/SSATG%20archive/Fraunhofer%20submission/Fraunhofer%20MPEG_SAC_for_Broadcast_Applications_White_Paper_v2; Fraunhofer IIS, Erlangen, Germany, Mar. 2005, 6 pgs.

(Continued)

*Primary Examiner* — Alpus Hsu
(74) *Attorney, Agent, or Firm* — Harrington & Smith

(57) ABSTRACT

Embodiments herein relate to methods, apparatuses, and computer program products for position stream session negotiation. An example method includes: transmitting, to a positioning system, a message for initiating a positional data stream associated with at least one audio source, the message comprising one or more requirements for positional characteristics of the positional data stream; receive a response from the positioning system comprising an indication of one or more of the positional characteristics that are supported by the positioning system for the at least one audio source; and initiating the position data stream with the positioning system based on the received response.

19 Claims, 8 Drawing Sheets

---

700 — transmitting, to a positioning system, a message for initiating a positional data stream associated with at least one audio source, the message comprising one or more requirements for positional characteristics of the positional data stream 702 — receive a response from the positioning system comprising an indication of one or more of the positional characteristics that are supported by the positioning system for the at least one audio source 704 — initiating the position data stream with the positioning system based on the received response

(56) References Cited

U.S. PATENT DOCUMENTS

| | | | | |
|---|---|---|---|---|
| 6,885,869 | B2* | 4/2005 | Raith | H04M 1/725 |
| | | | | 455/456.6 |
| 7,028,101 | B2* | 4/2006 | Costa-Requena | H04L 29/12094 |
| | | | | 709/245 |
| 7,312,752 | B2* | 12/2007 | Smith | H04W 64/00 |
| | | | | 342/464 |
| 7,602,338 | B2* | 10/2009 | Smith | G01S 5/021 |
| | | | | 342/451 |
| 7,710,945 | B2* | 5/2010 | Jonsson | H04L 29/06027 |
| | | | | 370/352 |
| 7,797,740 | B2* | 9/2010 | Blom | H04L 63/10 |
| | | | | 380/270 |
| 7,831,259 | B2* | 11/2010 | Cao | H04W 4/02 |
| | | | | 455/456.1 |
| 7,917,154 | B2* | 3/2011 | Fortescue | G06Q 30/02 |
| | | | | 455/456.1 |
| 8,199,001 | B2* | 6/2012 | Verbil | G01S 5/0027 |
| | | | | 340/539.13 |
| 8,351,589 | B2 | 1/2013 | Acero et al. | |
| 8,396,575 | B2* | 3/2013 | Kraemer | G10L 19/00 |
| | | | | 700/94 |
| 8,509,692 | B2 | 8/2013 | Ryle et al. | |
| 8,532,670 | B2* | 9/2013 | Kim | G01S 19/16 |
| | | | | 455/456.1 |
| 8,600,410 | B2* | 12/2013 | Wager | H04L 67/16 |
| | | | | 455/456.3 |
| 8,614,629 | B2* | 12/2013 | Verbil | G01S 5/0027 |
| | | | | 340/539.13 |
| 8,626,849 | B2* | 1/2014 | Yin | H04L 69/28 |
| | | | | 709/204 |
| 8,755,342 | B2 | 6/2014 | Iyer et al. | |
| 8,774,827 | B2* | 7/2014 | Scalisi | G01S 19/49 |
| | | | | 455/456.1 |
| 8,831,577 | B2* | 9/2014 | Ginn | H04N 21/25841 |
| | | | | 370/328 |
| 8,971,929 | B2* | 3/2015 | Li | H04W 4/02 |
| | | | | 342/357.32 |
| 9,172,912 | B2* | 10/2015 | Ye | H04N 7/147 |
| 9,204,359 | B2* | 12/2015 | Sapkota | H04W 36/36 |
| 9,542,241 | B2* | 1/2017 | Haase | G06F 9/54 |
| 9,578,459 | B2* | 2/2017 | Do | H04W 4/023 |
| 9,590,970 | B2* | 3/2017 | Patten | H04L 63/08 |
| 9,836,269 | B2* | 12/2017 | Yoo | G06F 3/16 |
| 9,933,270 | B2* | 4/2018 | Scalisi | G06F 16/9537 |
| 2002/0070881 | A1* | 6/2002 | Marcarelli | G01S 5/0027 |
| | | | | 340/988 |
| 2005/0005025 | A1* | 1/2005 | Harville | H04L 29/06027 |
| | | | | 709/241 |
| 2006/0062202 | A1* | 3/2006 | Oesterling | H04L 29/06027 |
| | | | | 370/352 |
| 2009/0210801 | A1 | 8/2009 | Bakir et al. | 715/753 |
| 2010/0265880 | A1* | 10/2010 | Rautiola | H04W 88/06 |
| | | | | 370/328 |
| 2012/0166531 | A1* | 6/2012 | Sylvain | H04L 67/18 |
| | | | | 709/204 |
| 2015/0036848 | A1 | 2/2015 | Donaldson | |
| 2015/0078556 | A1 | 3/2015 | Shenoy et al. | |
| 2015/0091702 | A1* | 4/2015 | Gupta | G06K 7/10306 |
| | | | | 340/10.4 |
| 2015/0207478 | A1 | 7/2015 | Duwenhorst | |
| 2018/0054793 | A1* | 2/2018 | Renaldi | H04W 64/00 |

FOREIGN PATENT DOCUMENTS

| | | |
|---|---|---|
| CN | 101952817 A | 1/2011 |
| CN | 102625077 A | 8/2012 |
| CN | 103428220 A | 12/2013 |
| EP | 3059732 A1 | 8/2016 |
| WO | 2006/125849 A1 | 11/2006 |
| WO | WO-2011020065 A1 | 2/2011 |

OTHER PUBLICATIONS

Video Content Analysis. Wikipedia, [online], Nov. 17, 2016 [retrieved on Mar. 15, 2018]. Retrieved from https://en.wikipedia.org/w/index.php?title=Video_content_analysis&oldid=749969745, the whole document.

Polk, James, "Session Initiation Protocol (SIP) Location Get Function; draft-polk-sip-locaion-get-00", Cisco Systems, Jul. 7, 2008, 19 pages.

* cited by examiner

POSITION STREAM SESSION NEGOTIATION FOR SPATIAL AUDIO APPLICATIONS

TECHNICAL FIELD

This invention relates generally to audio over internet protocol (AoIP) and, more specifically, relates to audio position streams session negotiation for spatial audio applications.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

The Session Initiation Protocol (SIP) is a communications protocol for signaling and controlling multimedia communication sessions. The most common applications of SIP are in Internet telephony for voice and video calls, as well as instant messaging, over Internet Protocol (IP) networks. It is increasingly becoming more popular for audio professionals to use audio transport over IP (AoIP) to transport professional grade audio (e.g. 24-bit 44 KHz, 48 KHz, 96 KHz, etc.).

SUMMARY

The following summary is merely intended to be exemplary. The summary is not intended to limit the scope of the claims.

In accordance with one aspect, an apparatus includes: at least one processor; and at least one memory including computer program code, the at least one memory and the computer program code configured, with the at least one processor, to cause the apparatus to perform at least the following: transmit, to a positioning system, a message for initiating a positional data stream associated with at least one audio source, the message comprising one or more requirements for positional characteristics of the positional data stream; receive a response from the positioning system comprising an indication of one or more of the positional characteristics that are supported by the positioning system for the at least one audio source; and initiate the position data stream with the positioning system based on the received response.

In accordance with another aspect, a method includes: transmitting, to a positioning system, a message for initiating a positional data stream associated with at least one audio source, the message comprising one or more requirements for positional characteristics of the positional data stream; receiving a response from the positioning system comprising an indication of one or more of the positional characteristics that are supported by the positioning system for the at least one audio source; and initiating the position data stream with the positioning system based on the received response.

In accordance with another aspect, a computer program product includes a non-transitory computer-readable storage medium having computer program code embodied thereon which when executed by an apparatus causes the apparatus to at least transmit, to a positioning system, a message for initiating a positional data stream associated with at least one audio source, the message comprising one or more requirements for positional characteristics of the positional data stream; receive a response from the positioning system comprising an indication of one or more of the positional characteristics that are supported by the positioning system for the at least one audio source; and initiate the position data stream with the positioning system based on the received response.

In accordance with one aspect, an apparatus includes: at least one processor; and at least one memory including computer program code, the at least one memory and the computer program code configured, with the at least one processor, to cause the apparatus to perform at least the following: receive, at a positioning system, a message for initiating a positional data stream associated with at least one audio source, the message comprising one or more requirements for positional characteristics of the positional data stream; determine position data stream characteristics supported by the positioning system for the at least one audio source based on the one or more position data stream requirements; and transmit a response indicating the position data stream characteristics supported by the positioning system for the at least one audio source In accordance with another aspect, a method comprises: receiving, at a positioning system, a message for initiating a positional data stream associated with at least one audio source, the message comprising one or more requirements for positional characteristics of the positional data stream; determining position data stream characteristics supported by the positioning system for the at least one audio source based on the one or more position data stream requirements; and transmitting a response indicating the position data stream characteristics supported by the positioning system for the at least one audio source.

In accordance with another aspect, a computer program product includes a non-transitory computer-readable storage medium having computer program code embodied thereon which when executed by an apparatus causes the apparatus to at least: receive, at a positioning system, a message for initiating a positional data stream associated with at least one audio source, the message comprising one or more requirements for positional characteristics of the positional data stream; determine position data stream characteristics supported by the positioning system for the at least one audio source based on the one or more position data stream requirements; and transmit a response indicating the position data stream characteristics supported by the positioning system for the at least one audio source

BRIEF DESCRIPTION OF THE DRAWINGS

The foregoing aspects and other features are explained in the following description, taken in connection with the accompanying drawings, wherein.

DETAILED DESCRIPTION

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

As used herein, high accuracy indoor positioning (HAIP) refers to a BT-LE (BLUETOOTH Low Energy) based high accuracy indoor positioning. A HAIP system includes, for example, BT-LE radio frequency (RF) tags which transmit a RF signal at a specific frequency. A locator is an antenna array which receives the tag signal and determines direction of arrival for each of the corresponding tags. A HAIP system typically uses ceiling based locators for example. A related positioning system is referred to herein as '360 HAIP'. 360 HAIP can provide direction of arrival or position information in all directions. Although embodiments are described herein with reference to HAIP and 360 HAIP, this is not intended to be limiting, and is generally applicable to any positioning system which can provide position tracking information with different formats and frequency, such as indoor positioning systems based on WIFI for example.

Spatial audio application (SAA) as used herein refers to audio applications which may utilize position tracking for sound sources of interest.

Embodiments described herein relate to the audio over IP signaling and transport mechanism for enabling position data session negotiation to enable the use of automatically generated panning data, which is relevant to, for example, distributed audio capture or playback application in general, or spatial audio mixing (SAM) type of application in particular. One feature for distributed audio capture and spatial audio mixing includes tracking the position of sound sources of interest. The positions of sound sources of interest may be tracked, for example, using a HAIP system.

The exemplary embodiments herein describe techniques for position stream session negotiation for audio applications that benefit from the use of position tracking information about an object or a sound source of interest, such as spatial audio applications for example. Additional description of these techniques is presented after a system into which the exemplary embodiments may be used is described.

Figure 1:
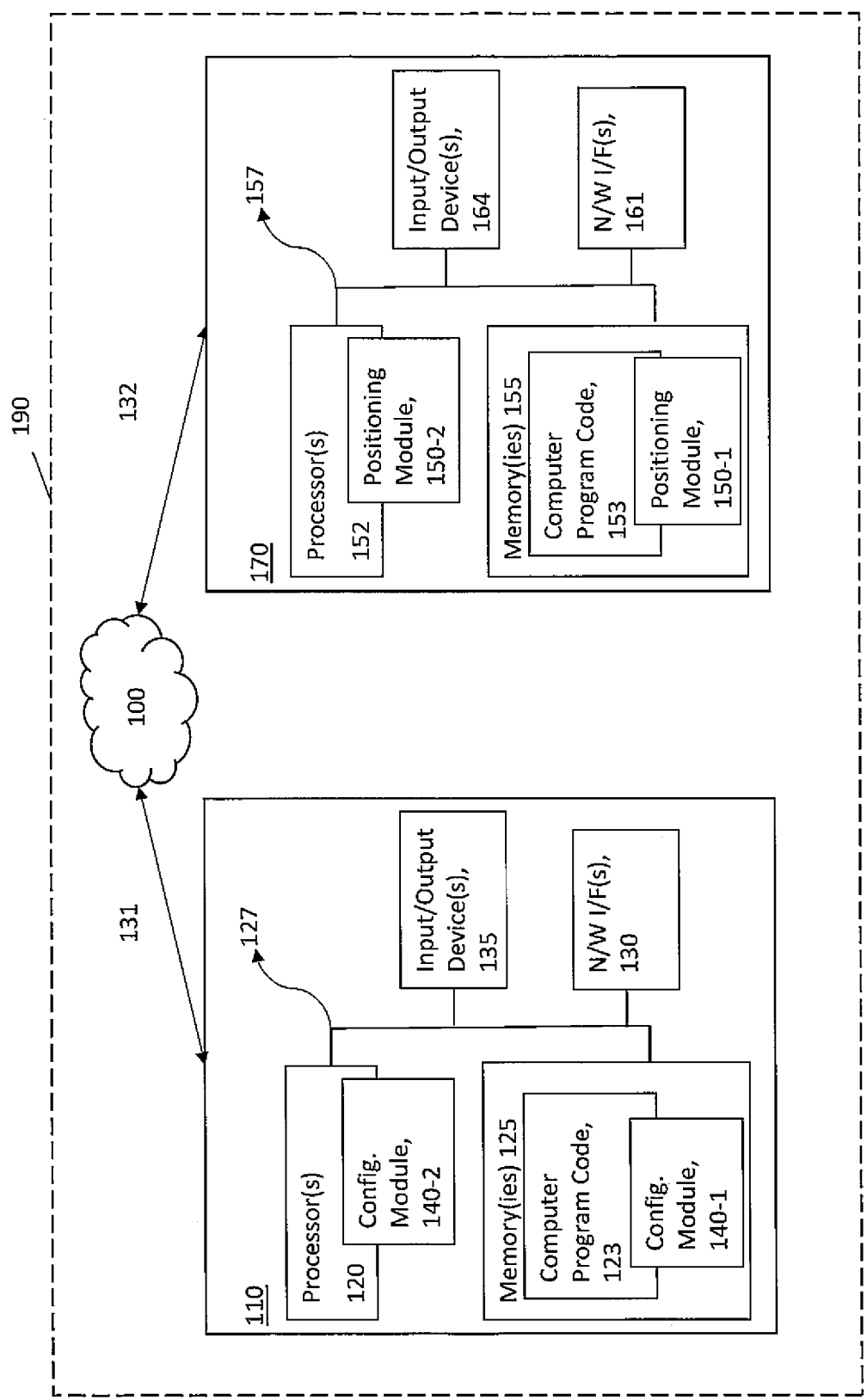
FIG. 1 is a block diagram of one possible and non-limiting exemplary apparatus in which the exemplary embodiments may be practiced.

Turning to FIG. 1, this figure shows a block diagram of one possible and non-limiting exemplary system in which the exemplary embodiments may be practiced. In FIG. 1, a device 110 and device 170 are in communication with a network 100. For simplicity, FIG. 1 includes only two devices 110, 170, however it should be understood that one or more of devices 110 and 170 may also be in communication with the network 100. Although not shown, the network may also comprise further devices, such as access points, switches, and servers, for example.

The device 110 includes one or more processors 120, one or more memories 125, and one or more network interfaces (N/W I/F(s)) 130, interconnected through one or more buses 127. The one or more buses 127 may be address, data, or control buses, and may include any interconnection mechanism, such as a series of lines on a motherboard or integrated circuit, fiber optics or other optical communication equipment, and the like. The one or more memories 125 include computer program code 123. The device may communicate with other devices on the network 100 via link 131 using N/W I/F(s)) 130. The link 131 may be wired or wireless or both, and utilize, for example, any suitable wireless and/or wired protocols, such as but not limited to, cellular, Bluetooth, WiFi, Ethernet, Digital Audio Network Through Ethernet (DANTE), for example. In some embodiments, the apparatus 110 may include one or more input and/or output devices 135. The input and/or output devices 135 may be any commonly known device for inputting or outputting information to or from a computer system, e.g. a mouse, a keyboard, a touch pad, a camera, a touch screen, a transducer, microphone/microphone arrays, display, projector, GPS, gyroscope, accelerometer, receiver, transmitter, receiver, antenna, and/or speaker.

The device 110 includes a configuration module, comprising one of or both parts 140-1 and/or 140-2, which may be implemented in a number of ways. The configuration module may be implemented in hardware as configuration module 140-1, such as being implemented as part of the one or more processors 120. The configuration module 140-1 may be implemented also as an integrated circuit or through other hardware such as a programmable gate array. In another example, the configuration module may be implemented as configuration module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein.

FIG. 1 also includes a device 170 in communication with the network 100. The device 170 may include one or more processors 152, one or more memories 155, one or more network interfaces (N/W I/F(s)) 161, and one or more input/output devices 164 interconnected through one or more buses 157. The one or more memories 155 include computer program code 153. The device 170 includes a positioning module, comprising one of or both parts 150-1 and/or 150-2, which may be implemented in a number of ways. The positioning module may be implemented in hardware as positioning module 150-1, such as being implemented as part of the one or more processors 152. The positioning module 150-1 may be implemented also as an integrated circuit or through other hardware such as a programmable gate array. In another example, the positioning module may be implemented as positioning module 150-2, which is implemented as computer program code 153 and is executed by the one or more processors 152. For instance, the one or more memories 155 and the computer program code 153 are configured to, with the one or more processors 152, cause the device 170 to perform one or more of the operations as described herein.

The one or more buses 157 may be address, data, or control buses, and may include any interconnection mechanism, such as a series of lines on a motherboard or integrated circuit, fiber optics or other optical communication equipment, and the like. The one or more memories 155 include computer program code 153. The device may communicate with other devices on the network 100 via link 132 using N/W I/F(s)) 161. The link 132 may be wired or wireless or both, and utilize, for example, any suitable wireless and/or wired protocols, such as but not limited to, cellular, Bluetooth, WiFi, Ethernet, Digital Audio Network Through Ethernet (DANTE), for example. In some embodiments, the apparatus 100 may include one or more input and/or output devices 164. The input and/or output devices 164 may be any commonly known device for inputting or outputting information to or from a computer system, e.g. a mouse, a keyboard, a touch pad, a camera, a touch screen, a transducer, microphone/microphone arrays, display, projector, GPS, gyroscope, accelerometer, receiver, transmitter, receiver, antenna, and/or a speaker.

The computer readable memories 125 and 155 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125 and 155 may be means for performing storage functions. The processors 120 and 152 may be of any type suitable to the local technical environment, and may include one or more of general purpose computers, special purpose computers, microprocessors, digital signal processors (DSPs) and processors based on a multi-core processor architecture, as non-limiting examples. The processors 120 and 152 may be means for performing functions, such as controlling the device 110, device 170, and other functions as described herein.

In general, the various embodiments of the device 110 and 170 can include, but are not limited to cellular telephones such as smart phones, tablets, personal digital assistants (PDAs), computers such as desktop and portable computers, gaming devices, music storage and playback appliances, tablets as well as portable units or terminals that incorporate combinations of such functions.

In another example, a device 190 may include both configuration module 140-1 and/or 140-2 and the positioning module 150-1 and/or 150-2. In such an example device 190, at least some of the various components of device 110 and 170 may be the same (e.g. processors 120 and 152, memories 125 and 155, etc.) even though these are shown as separate component in the example of FIG. 1. Further, in the case of device 190 the network 100 may be, for example, a local socket that is used to exchange data between configuration module 140-1 and/or 140-2 and the positioning module 150-1 and/or 150-2

Having thus introduced one suitable but non-limiting technical context for the practice of the exemplary embodiments of this invention, the exemplary embodiments will now be described with greater specificity.

The following technologies and standards generally relate to AoIP:

DANTE (Digital Audio Network Through Ethernet), developed by AUDINATE, is a combination of software, hardware, and network protocols that deliver uncompressed, multi-channel, low-latency digital audio over a standard Ethernet network using Layer 3 IP packet;

AES 67 is a standard for audio-over-IP interoperability. The standard was developed by the Audio Engineering Society and published in September 2013. It is a layer 3 protocol suite based on existing standards and is designed to allow interoperability between various IP-based audio networking systems such as RAVENNA, LIVEWIRE, Q-LAN and DANTE. It also identifies commonalities with Audio Video Bridging (AVB) and documents AVB interoperability scenarios.

The above protocols support audio data packetization, session negotiation and transport parameters. AES67 in particular leverages the standard IETF protocols in the proposed standard. However, one limitation of the above methods is that they do not support audio source position data which is increasingly relevant for immersive audio capture and playback. These methods) do not support unified transmission, reception and transport of source position information, and do not provide any mechanisms for negotiating position update frequency. This causes these solutions to be inefficient in a number of ways. For example, excess battery usage may lower tag life if the user configures it to maximum expected update frequency, and in case of positioning technologies that use a shared radio spectrum (e.g., a HAIP system)), the number of tags that can be used simultaneously without performance degradation is reduced.

Figure 2:
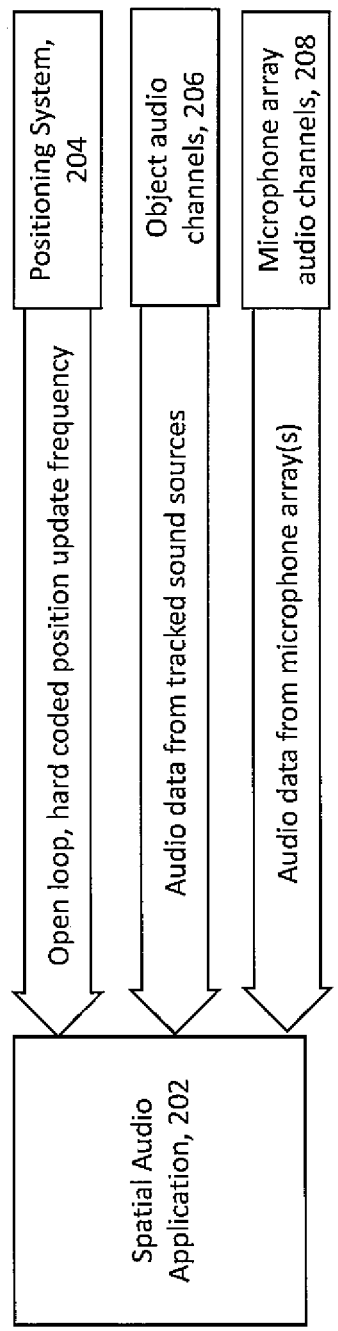
FIG. 2 is a data flow diagram including an example spatial audio capture application and an example positioning system in accordance with exemplary embodiments.

Referring now to FIG. 2, this figure shows a simplified data flow diagram between a conventional spatial audio capture application 202 and positioning system 204. In this figure, a spatial audio application 202 is an application that may, for example, create, monitor, edit, and/or mix spatial audio (e.g. object-based audio), from different audio sources. The spatial audio application 202 may receive audio data from object audio channels 206 and/or microphone array audio channels 208. For example, the audio object channels 206 and the microphone array audio channels 208 may consist of live data. The object channels 206 could also include pre-recorded data. The audio data received from the microphone array audio channels 208 and the object audio channels 206 may be associated with various identifiers or 'tags' so that a user of the spatial audio application 202 can manage the received audio data. The spatial audio application may also receive position updates from a positioning system 204, such as a high accuracy indoor positioning system (HAIPS) for example. The positioning data streamed from the positioning system 204 may be based on various motion sensors such as accelerometers, gyroscope, etc. Typically, the frequency in which the positing data is received is hardcoded, and done in an open-loop fashion. The hardcoded frequency may be set by a user based on a per-tag basis, or may be set to some default value. In the example, shown in FIG. 2, there is no feedback from either the application 202 or the positioning system 204. This approach of configuring the tag update frequency is laborious, susceptible to human errors, and inefficient.

Position updates for audio source position data are needed for smooth and flawless mixing of tracked audio sources. Fast moving objects need a higher position update frequency versus slow moving objects. Subsequently, an extension to add support for a unified audio source position transport is required.

Exemplary embodiments relate to session negotiation for distributed audio capture or any application that needs to utilize position data for rendering media with high precision and low latency. According to exemplary embodiments, a position stream session negotiation may occur between an enhanced spatial audio application and positioning system in order to provide a position stream which meets the application driven requirements for position data characteristics. For example, a spatial audio application offers the requirements it expects for a desirable audio mixing and playback experience. These requirements may be encoded as SDP offer and transported as part of the SIP INVITE message to the positioning system. In some examples, a position stream identifier, defined by a new position attribute (which may be denoted as pos-stream-id) is signaled as a media level attribute as part of the SDP offer. The positioning system then indicates the supported update frequency, taking into account its capabilities. For example, whether the positioning system can provide only direction of arrival position updates (azimuth, elevation) or (azimuth, elevation, distance). After receiving the supported position data details, the spatial audio application can initialize the data receiver ports and buffers. In some embodiments, the position update session is re-negotiated by the spatial audio application or the positioning system, if the tracked audio source position undergoes a change in its movement characteristics for more than a threshold interval. For example, if the tracked audio source motion characteristics are monitored by the positioning system (using inbuilt motion sensors like accelerometer, gyroscope, etc.), a re-INVITE is sent by the positioning system, or if the tracked sound source motion characteristics are monitored by the spatial audio application using visual analysis or microphone array derived spatial audio analysis, the re-INVITE is issued by the spatial audio application.

The SIP/SDP session set-up negotiates position data transport stream characteristics. The transport protocol choice can be RTP or UDP or TCP, depending on the application requirements and network characteristics. Embodiments herein are described with reference to UDP based position stream so as to minimize latency and enable leveraging the low latency audio over IP transport methods, but this should not be seen as limiting. The positioning system data can be signaled as a new payload type (PT) corresponding to a protocol of the positioning system (such as a HAIP system). Different payload encoding parameters may depend on the type of payload provided by the positioning system. Some non-limiting examples are:

Direction of Arrival (DOA), consisting of Azimuth and Elevation information with respect to a reference position (e.g., HAIP);

Direction of Arrival and distance (DOAD), consisting of Azimuth, Elevation and Distance information with respect to a reference position (e.g. a reference 360 HAIP locator from a group of multiple 360 HAIP locators);

2D position in Cartesian coordinates (Cart), providing coordinates in two axis with respect to the reference of positioning system which provides absolute position information (e.g., Conventional HAIP on the ceiling which provides position information, Multiple 360 HAIPs which provide 2D position information); and 3D position in Cartesian coordinates (Cart3D).

In combination with different payload types, there are also update (e.g. sampling) frequencies. The payload types and update frequencies may be represented in a sample session description protocol offer. An example of such a SDP offer is as follows:

1: m=application 1432 RTP haip 1 2 3 4 5
2: a=recvonly
3: a=pos-stream-id:<HAIP tag ID>
4: a=haip:1 DOA/50
5: a=haip:2 Cart/20
6: a=haip:3 DOA/20
7: a=haip:4 DOAD/20
8: a=haip:5 Cart3D/20

In the example SDP offer above, lines 4-8 provide different configurations in order of priority (i.e. 1-5). For example, the highest priority configuration, at line 4, indicates that distance of arrival and a 50 Hz update frequency is preferred. This flexibility enables meeting the application requirements with the best possible alternative supported by the positioning system. A session can be re-negotiated if the positioning system or the spatial audio application determines a need to do so. In some examples, the session negotiation could be done using HTTP transport for signaling with XML for carrying the offer and answer data.

Figure 3:
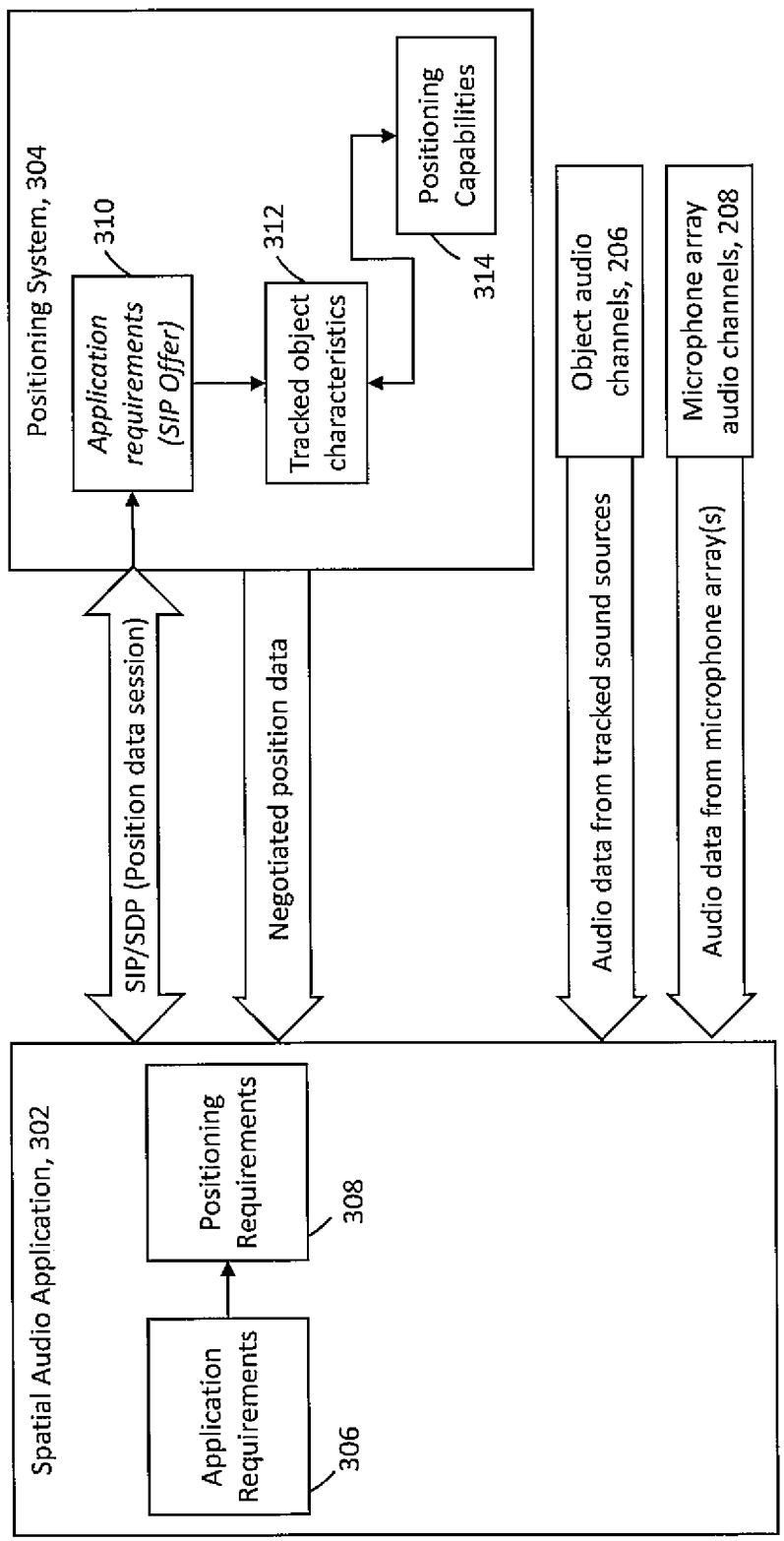
FIG. 3 is a data flow diagram including another example spatial audio capture application and another example positioning system in accordance with exemplary embodiments.

Referring also to FIG. 3, this figure illustrates a data flow diagram including an example enhanced spatial audio application 302 and an example enhanced positioning system 304 in accordance with exemplary embodiments. The example spatial audio application 302 includes an application requirements module 306 and positioning requirements module 308. The application requirements module 306 may, for example, correspond to computer program code for obtaining application specific requirements for the spatial audio application 302. These application specific requirements can be obtained by determining motion characteristics as well as the required precision for an accurate audio movement perception. According to some embodiments, motion characteristics are converted into linear or angular velocity (depending on the method of positioning used). In FIG. 3, the requirements determined by the application requirements module 306 are encoded by the position requirements module 308. The position requirements module 308 can encode the application requirements into a session description protocol (SDP) media requirement using an ABNF format reflecting which reflects the application requirements. For example, the application requirements data may be used as input to a mapping function of positioning requirements module 308 to obtain the position update frequency (Hz), the type of positioning data (Azimuth, Elevation, Distance) and the coordinate system (2D/3D, spherical/Cartesian, axes orientations) for the positioning system 304 output.

The mapping function indicates different configurations which include, for example, suitable payload types (e.g., DOA, DOAD, Cart, Cart3D, etc.) and an update frequency (e.g., 1 Hz/5 Hz/10 Hz/20 Hz/50 Hz/1000 Hz, etc.) to be indicated in the SDP.

The mapping function may be based on mapping a database of tracked object characteristics and the corresponding tag frequency. In other embodiments the mapping function may be a heuristic relationship derived from data collection for a particular scenario (e.g., a concert in a particular venue). The relationship derived from heuristics data could be used (in addition to the application requirements). For example, depending on the session negotiation preferences, the heuristic data may override application requirements or vice versa. The mapping function results in a possible configuration if there is a match between application requirements and positioning system capabilities. In some embodiments, an inexact match may be accepted in case there is no direct match.

In examples, a user of the spatial audio application 302 can create profiles for different tracked objects of interests (OOIs) via manual inputs. In yet another embodiment, the OOI characteristics are initially determined by the spatial application (e.g. automatically and/or based on user input) and subsequent updates may be determined by the positioning system 304. The encoded application requirements are then transmitted to the positioning system 304, which in this example is via a session initiation protocol (SIP) Offer as indicated by block 310.

Referring now to the positioning system 304 shown in FIG. 3. The SIP Offer is received by the positioning system 304 SIP user agent, and the positioning system 304 parses the SIP offer and selects a configuration from the configurations indicated by the SIP Offer. For example, the positioning system 304 may select a first configuration that is supported by the positioning system 304 using the tracked object characteristics module 312 and the positioning capabilities module 314. For example, the positioning capabilities module 314 may include information relating to types of hardware or sensors of the positioning system 304, which may determine how an audio source is tracked. The tracked object characteristics module 312 may collect and provide positioning data of a tracked audio source, such as an angular or a linear velocity of the tracked audio source depending on capabilities indicated by the positioning capabilities 314 module (e.g. types of sensors, hardware, and method of tracking the audio source). The positioning capabilities module 314 may select the closest matching payload type and update frequency supported by the positioning system 304. The selected configuration (e.g. output parameters) is signaled back to the spatial audio application 302 as a SIP Answer, and the position data is sent from the positioning system 304 to the spatial audio application 302 based on the negotiated configuration. It can be seen that the enhanced positioning system 304 consists of two additional components (the tracked object characteristics 312 module and the positioning capabilities module 314) as compared to the positioning system 204 as shown in FIG. 2. The tracked object characteristics 312, in case of a radio tag based positioning system for example, can utilize motion sensors built into the radio positioning tag (e.g., HAIP tag). The information from the sensors can be leveraged by the positioning system 304 to update the initially negotiated parameters at some later time, if found to be acceptable by the spatial application 302.

Table 1 below provides an example of data that is associated with three different objects of interest, e.g. tracked audio sources. Table 1 shows the corresponding linear velocity, angular velocity, and object priority data associated with each of the tracked audio sources. The first audio source is identified by Object of Interest Identifier 'OID-1'. The linear and/or angular velocity for OID-1 is collected from a first positioning system (e.g. positioning system 304). Similarly, the OID-2 and OID-3 may be audio sources that are tracked by other positioning systems. A spatial audio application may update the information for each of the audio sources as the data is received from the positioning systems and/or based on tracking performed by the spatial audio application.

TABLE 1

| Object of Interest Identifier | Linear velocity (m/sec) | Angular velocity (degrees/sec) | Object Priority (1-5) |
| --- | --- | --- | --- |
| OID-1 | 1 | 1 | 1 |
| OID-2 | 0.1 | 0.1 | 5 |
| OID-3 | 2 | 3 | 3 |

The table above also includes object priority for each of the object identifiers. The purpose of the object priority is to ensure higher tracking resource allocation priority for high priority objects. A low priority object can be allocated with reduced resources (if the situation so demands). For example, a high priority object will tracked with as high frequency as indicated but a low priority object may be tracked with reduced position update frequency (if there is shortage of radio resources). In addition, OOI information may be obtained independently by the positioning system; or may be signaled by the HAIP tag or the audio application directly in the session negotiation message Offer/Answer negotiation.

Figure 4:
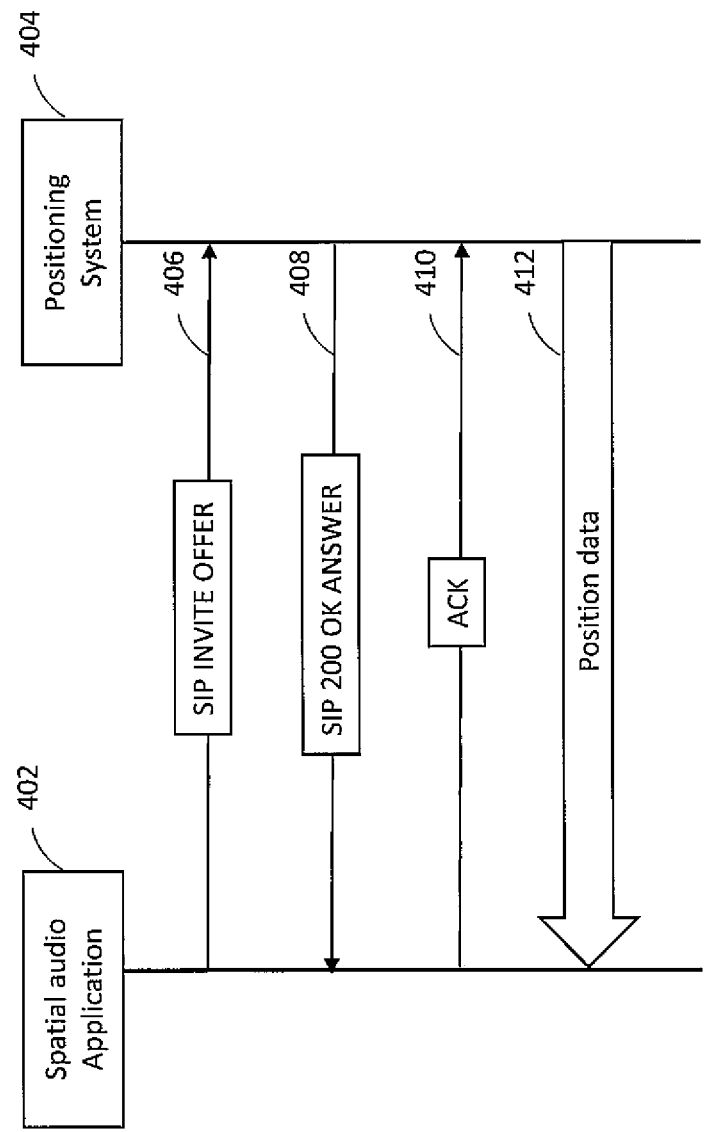
FIG. 4 is a signaling diagram of an example position stream negotiation in accordance with exemplary embodiments.

Referring to FIG. 4, this figure shows an example session negotiation between a spatial audio application 402 and positioning system 404 in accordance with exemplary embodiments. In this example session initiation protocol (SIP) is used. According to SIP, SIP 100 responses are provisional responses, and '200' responses refer to successful responses. The positioning system 404 may refer to, for example, a tracked audio source position data transmitter. In the example shown in FIG. 4, the spatial audio application 402 sends a session initiation SIP INVITE OFFER as shown at 406 to positioning system 404. The SIP INVITE OFFER may include: position tracking requirements, an update frequency, position data coordinate system, and/or position data attributes. At 408, the positioning system 404 sends a SIP 200 OK ANSWER. In this example the SIP 200 OK ANSWER may include a supported update frequency, supported data coordinate system, and/or supported position data attributes. At 410, the spatial audio application 402 sends an acknowledgement (ACK) in response to 408. Finally, at 412 the position data is transmitted from the positioning system 404 to the spatial audio application 402.

Figure 5:
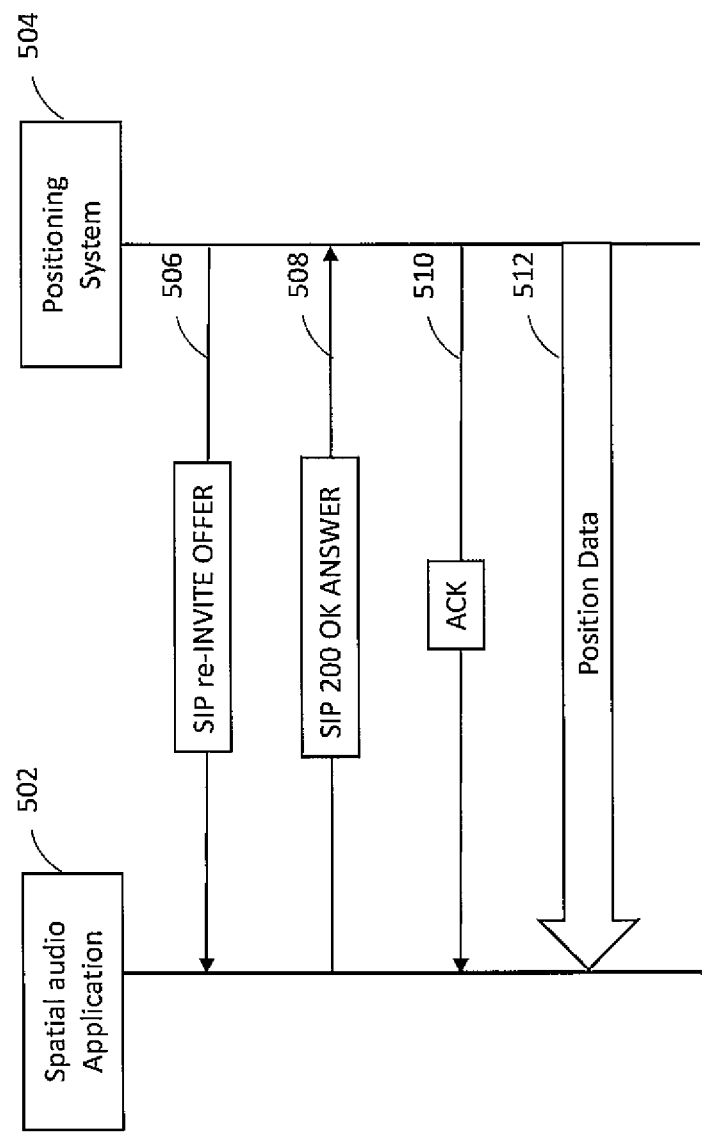
FIG. 5 is a signaling diagram of an example session re-negotiation in accordance with exemplary embodiments.

Referring to FIG. 5, this figure shows an example session re-negotiation between a spatial audio application 502 and positioning system 504 in accordance with exemplary embodiments. According to FIG. 5, the initial parameters for a position data stream have already been negotiated (e.g. as shown in FIG. 4). At 506, the positioning system 504 transmits a SIP re-INVITE OFFER. The SIP re-INVITE OFFER is sent in response to the positioning system 504 detecting that movement characteristics of a tracked audio source have changed over for a time period greater than predetermined threshold, for example. At 506 The SIP re-INVITE OFFER may request changes to the initial parameters (e.g. as determined by FIG. 4) based on the changed motion characteristics. At 508, the spatial audio application 502 sends a SIP 200 OK ANSWER. In this example, the SIP 200 OK ANSWER may indicate the most suitable payload type and sampling frequency selected by the spatial audio application 502 based on the SIP re-INVITE OFFER. At 510, the positioning system 504 sends an acknowledgement (ACK) in response to 508. Finally, at 512 the position data is transmitted from the positioning system 504 to the spatial audio application 502 according to the negotiated parameters.

Figure 6:
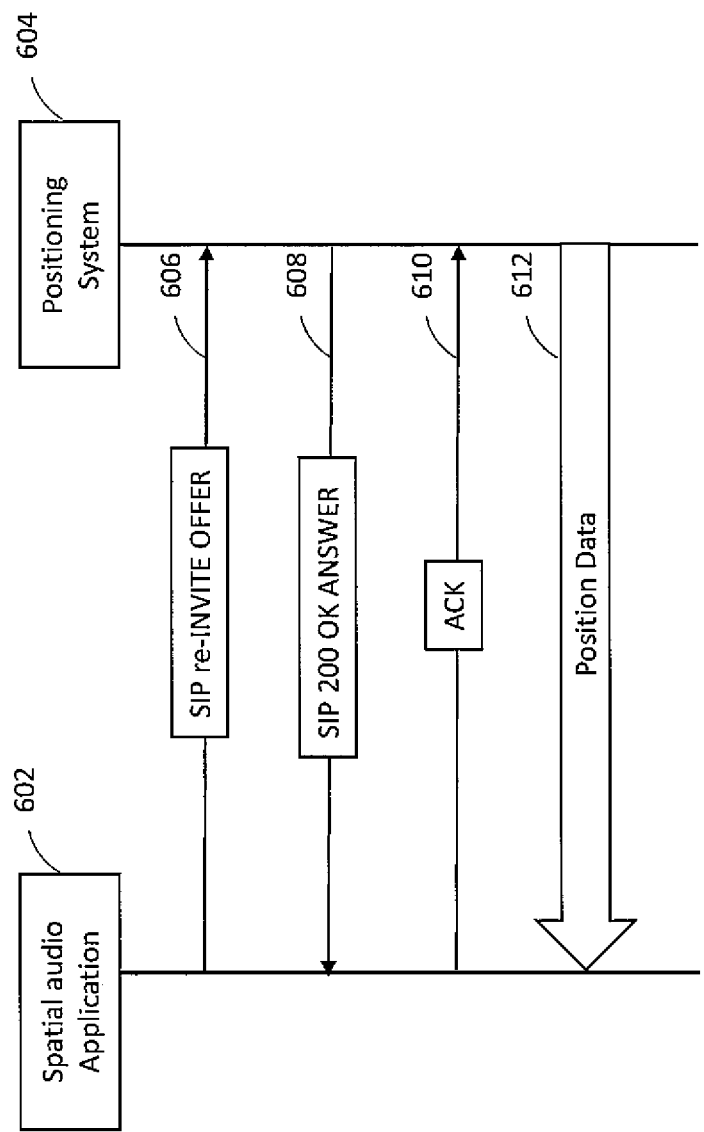
FIG. 6 is a signaling diagram of another example session re-negotiation in accordance with exemplary embodiments.

Referring to FIG. 6, this figure shows an example session re-negotiation between a spatial audio application 602 and positioning system 604 in accordance with exemplary embodiments. In this example, the re-negotiation is initiated by the spatial audio application 602 by transmitting SIP re-INVITE Offer as shown at 606. The SIP re-INVITE Offer may be sent in response to the spatial audio application 602 detecting that movement characteristics of a tracked audio source have changed over for a time period greater than predetermined threshold. For example, the spatial audio application 602 may monitor an audio source using visual analysis or microphone array derived spatial audio analysis.

The SIP re-INVITE OFFER may include proposed changes to the initial parameters based on the determined changes to the movement characteristics. At 608, the positioning system 604 sends a SIP 200 OK ANSWER, which includes a supported payload type and update frequency. At 610, the spatial audio application 602 sends an acknowledgement (ACK) in response to 608. Finally, at 612 the position data is transmitted to from the positioning system 604 to the spatial audio application 602.

In some examples the SIP INVITE messages described above may indicate the requirements by providing a list of possible configurations, and a response may include one or more of the configurations in the list that are supported. In other examples, a response to the SIP INVITE message may include just an acknowledgement (ACK) to indicate acceptance of one or more of the requested parameters.

Two non-limiting examples of an OFFER and ANSWER in accordance with exemplary embodiments are now described. The first example is an SIP INVITE OFFER from a spatial audio application requesting initiation of a position session, such that the SIP INVITE OFFER possible configurations for the session in priority order. The example SIP INVITE OFFER is as follows:

```
1:   INVITE sip:user2@biloxi.com SIP/2.0
2:   via: SIP/2.0/UDP www.biloxi.com
3:   From: sip:user1@biloxi.com
4:   To: Sip:user2@biloxi.com
5:   Call-ID: 3456@biloxi.com
6:   Cseq: 1 INVITE
7:   Content-Type: application/sdp
8:   Content-Length: ...
9:   CRLF
10:  v=0
11:  o=user1 3241325 1 IN IP4 172.19.60.8
12:  c=IN IP 172.19.60.8
13:  t=0
14:  m=application 1432 udp haip 1 2 3 4
15:  a=recvonly
16:  a=pos-stream-id:<HAIP tag ID>
17:  a=haip:1 DOA/50
18:  a=haip:2 Cart/20
19:  a=haip:3 DOA/20
20:  a=haip:4 DOAD/20
```

In this example, the media line (line 14) describes the UDP receive port. The pos-stream attribute indicates the position tracking channel for which the session is being negotiated. At line 17-20, different format types are indicated. For example, DOA/50 indicates 'Direction of Arrival' and a position update frequency of 50 Hz. Similarly, Cart indicates Cartesian coordinate information in 2D. DOAD corresponds to direction of arrival+distance (Azimuth, Elevation, Distance). Although not shown in this example, another possible format may be Cart3D. The above invite message suggests, for example, that the application would need the positioning information in the described format in descending order of preference.

An example ANSWER from a positioning system to the above OFFER may be as follows:

```
1:   SIP/2.0 200 OK
2:   via: SIP/2.0/UDP www.biloxi.com
3:   From: sip:user1@biloxi.com
4:   To: Sip:user2@biloxi.com
5:   Call-ID: 3456@biloxi.com
6:   Cseq: 1 INVITE
7:   Content-Type: application/sdp
8:   Content-Length: ...
9:   CRLF
10:  v=0
11:  o=user1 3241325 1 IN IP4 172.19.60.8
12:  c=IN IP 172.19.60.8
13:  t=0
14:  m=application 1432 RTP haip 1
15:  a=pos-stream-id:<HAIP tag ID>
16:  a=recvonly
17:  a=haip:1 DOA/50
```

It is noted that line 17 of the example ANSWER above indicates that the first configuration from the OFFER is supported by the positioning system (i.e. the configuration indicated by line 17 in the OFFER above). Thus, the positioning system was capable of delivering the position stream for the specified tag at 50 Hz frequency and the locator/antenna configuration was suitable for providing DOA information.

A second example OFFER-ANSWER illustrates a situation where some of the configurations provided in the offer are not supported by, for example, the positioning device. In this example, the following SIP INVITE OFFER is provided by, for example, a spatial audio application:

```
1:   INVITE sip:user2@biloxi.com SIP/2.0
2:   via: SIP/2.0/UDP www.biloxi.com
3:   From: sip:user1@biloxi.com
4:   To: Sip:user2@biloxi.com
5:   Call-ID: 3456@biloxi.com
6:   Cseq: 1 INVITE
7:   Content-Type: application/sdp
8:   Content-Length: ...
9:   CRLF
10:  v=0
11:  o=user1 3241325 1 IN IP4 172.19.60.8
12:  c=IN IP 172.19.60.8
13:  t=0
14:  m=application 1432 udp hiap 1 2 3 4
15:  a=recvonly
16:  a=pos-stream-id:<HAIP tag ID>
17:  a=haip:1 DOA/50
18:  a=haip:2 Cart/20
19:  a=haip:3 DOA/20
20:  a=haip:4 DOAD/20
```

If the positioning system does not support distance and the tracked object is moving relatively slow, the positioning system may respond to the above offer with the following SIP 200 OK ANSWER is provided by:

```
1:   SIP/2.0 200 OK
2:   via: SIP/2.0/UDP www.biloxi.com
3:   From: sip:user1@biloxi.com
4:   To: Sip:user2@biloxi.com
5:   Call-ID: 3456@biloxi.com
6:   Cseq: 1 INVITE
7:   Content-Type: application/sdp
8:   Content-Length: ...
9:   CRLF
10:  v=0
11:  o=user1 3241325 1 IN IP4 172.19.60.8
12:  c=IN IP 172.19.60.8
13:  t=0
14:  m=application 1432 udp haip 3
15:  a=recvonly
16:  a=pos-stream-id:<HAIP tag ID>
17:  a=haip:3 DOA/20
```

The ANSWER above indicates that the positioning system chooses haip: 3 DOA/20. This could suggest the one of the following situations:

the positioning system knew that the said object of interest (tracked by the specific HAIP tag) is moving slower than what a 50 Hz update rate would need, and thus a lower frequency update for the object of interest is chose by the positioning system;

the positioning system determines, based on the radio spectrum or processing resources limitations, that it can only support a 20 Hz update rate; or the positioning tag supports only 20 Hz update rate.

The embodiments described herein could be integrated into software, such as an audio routing software and interface for mapping the various input/output channels in the Audio over IP network (e.g. using DANTE devices). One example of such software is DANTE CONTROLLER.

In some embodiments, the spatial audio application may be embedded under the hood of any existing or new audio routing systems in audio over IP domain (such as DANTE CONTROLLER). In terms of session setup, the DANTE CONTROLLER hosting device may be considered the spatial audio application, e.g. spatial audio application 302 and the positioning system (e.g. 304) may be a transmitter device. Each radio positioning tag may correspond to a position transmit channel.

Figure 7:
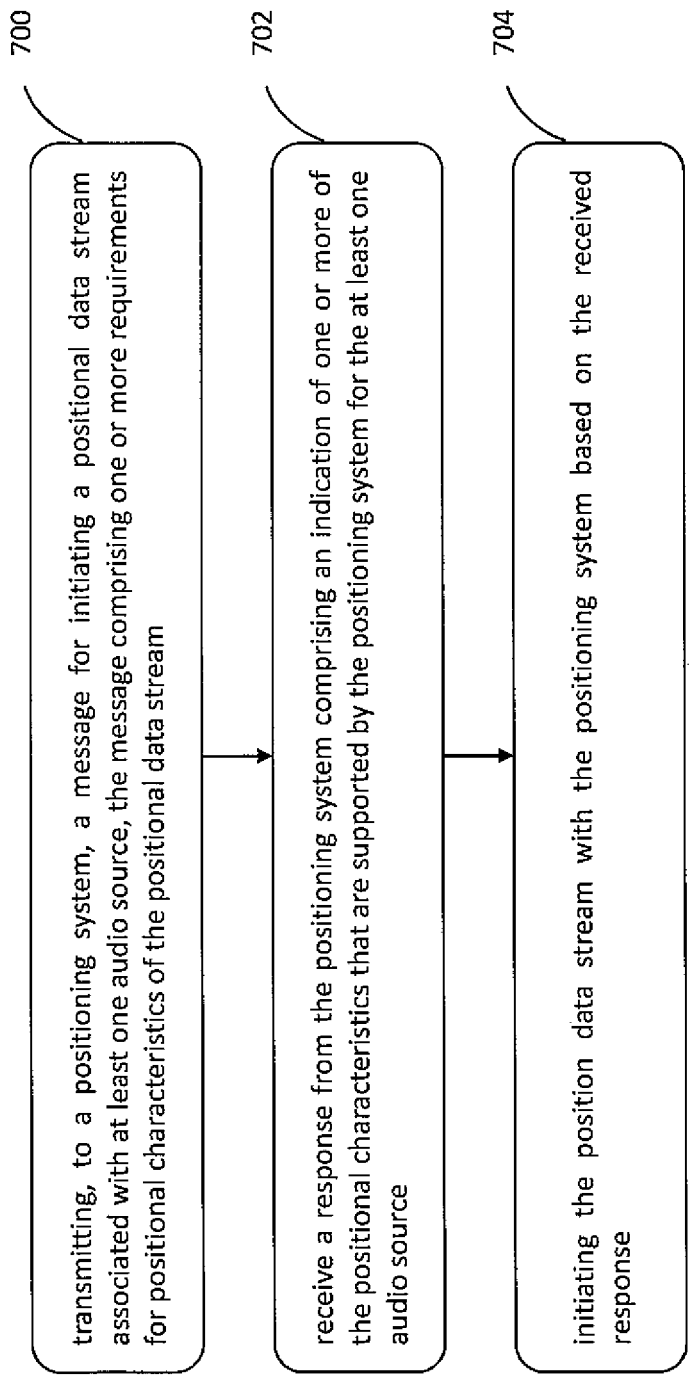
FIG. 7 is a logic flow diagram for position stream session negotiation, and illustrates the operation of an exemplary method, a result of execution of computer program instructions embodied on a computer readable memory, functions performed by logic implemented in hardware, and/or interconnected means for performing functions in accordance with exemplary embodiments.

FIG. 7 is a logic flow diagram for position stream session negotiation. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the configuration module 140-1 and/or 140-2 may include multiples ones of the blocks in FIG. 7, where each included block is an interconnected means for performing the function in the block. The blocks in FIG. 7 are assumed to be performed by the device 110 or device 190, e.g., under control of the configuration module 140-1 and/or 140-2 at least in part.

In one example embodiment, a method may include: transmitting, to a positioning system, a message for initiating a positional data stream associated with at least one audio source, the message comprising one or more requirements for positional characteristics of the positional data stream as indicated by block 700; receiving a response from the positioning system comprising an indication of one or more of the positional characteristics that are supported by the positioning system for the at least one audio source as indicated by block 702; and initiating the position data stream with the positioning system based on the received response as indicated by block 704.

The response may be further based on the capabilities of the positioning system. Initiating the position data stream may include sending an acknowledgment to the positioning system, and the method may further comprise: receiving data corresponding to the at least one audio source from the positioning system via the initiated position data stream. The method may further comprise: determining a change in a movement characteristic of the at least one audio source occurs for longer than a predetermined threshold; and transmitting a further message to re-negotiate the positional characteristics to account for the change. Determining the change in the movement characteristic may include tracking the at least one audio source based on at least one of: analysis of frames captured by a camera; and microphone array derived spatial analysis. The method may further include: receiving, from the positioning system, a message to re-negotiate the positional characteristics; and selecting new positional characteristics based on the received message. The message for initiating the positional data stream may include at least one of: one or more position update frequencies; one or more position data coordinate systems; and one or more position data attributes.

In one example embodiment, an apparatus (e.g. device 110 or device 190 of FIG. 1) may comprise at least one processor; and at least one memory including computer program code, the at least one memory and the computer program code may be configured, with the at least one processor, to cause the apparatus to perform at least the following: transmit, to a positioning system, a message for initiating a positional data stream associated with at least one audio source, the message comprising one or more requirements for positional characteristics of the positional data stream; receive a response from the positioning system comprising an indication of one or more of the positional characteristics that are supported by the positioning system for the at least one audio source; and initiate the position data stream with the positioning system based on the received response.

The response may be further based on the capabilities of the positioning system. The initiation of the position data stream may include sending an acknowledgment to the positioning system, and wherein the at least one memory and the computer program code may be configured, with the at least one processor, to cause the apparatus to perform at least the following: receive data corresponding to the at least one audio source from the positioning system via the initiated position data stream. The at least one memory and the computer program code may be configured, with the at least one processor, to cause the apparatus to perform at least the following: determine a change in a movement characteristic of the at least one audio source occurs for longer than a predetermined threshold; and transmit a further message to re-negotiate the positional characteristics to account for the change. The determination of the change in the movement characteristic may include the at least one memory and the computer program code being configured, with the at least one processor, to cause the apparatus to: track the at least one audio source based on at least one of: analysis of frames captured by a camera; and microphone array derived spatial analysis. The at least one memory and the computer program code may be configured, with the at least one processor, to cause the apparatus to perform at least the following: receive, from the positioning system, a message to re-negotiate the positional characteristics; and select new positional characteristics based on the received message. The message for initiating the positional data stream may include at least one of: one or more position update frequencies; one or more position data coordinate systems; and one or more position data attributes. The one or more position data attributes may include at least one of: azimuth, elevation; and distance. The response from the positioning system may indicate at least one of: a position update frequency supported by the positioning system; a position data coordinate system supported by the positioning system; and at least one position data attribute supported by the positioning system. The message for initiating the positional data stream may be a session initiation protocol (SIP) invite message, the one or more positional characteristics are encoded as a session description protocol (SDP) offer that is transmitted as part of the SIP invite message, and the SDP offer comprises a position stream identifier identifying the at least one audio source. The apparatus may comprise the positioning system, and the positional data may be received over the positional data stream via a local socket with the positioning system. The apparatus and the positioning system may be connected via a network.

In one example embodiment, an apparatus may comprise: means for transmitting, to a positioning system, a message for initiating a positional data stream associated with at least one audio source, the message comprising one or more requirements for positional characteristics of the positional data stream; means for receiving a response from the positioning system comprising an indication of one or more of the positional characteristics that are supported by the positioning system for the at least one audio source; and means for initiating the position data stream with the positioning system based on the received response.

In another embodiment, a computer program product may include a non-transitory computer-readable storage medium having computer program code embodied thereon which when executed by an apparatus causes the apparatus to perform: transmitting, to a positioning system, a message for initiating a positional data stream associated with at least one audio source, the message comprising one or more requirements for positional characteristics of the positional data stream; receiving a response from the positioning system comprising an indication of one or more of the positional characteristics that are supported by the positioning system for the at least one audio source; and initiating the position data stream with the positioning system based on the received response.

Figure 8:
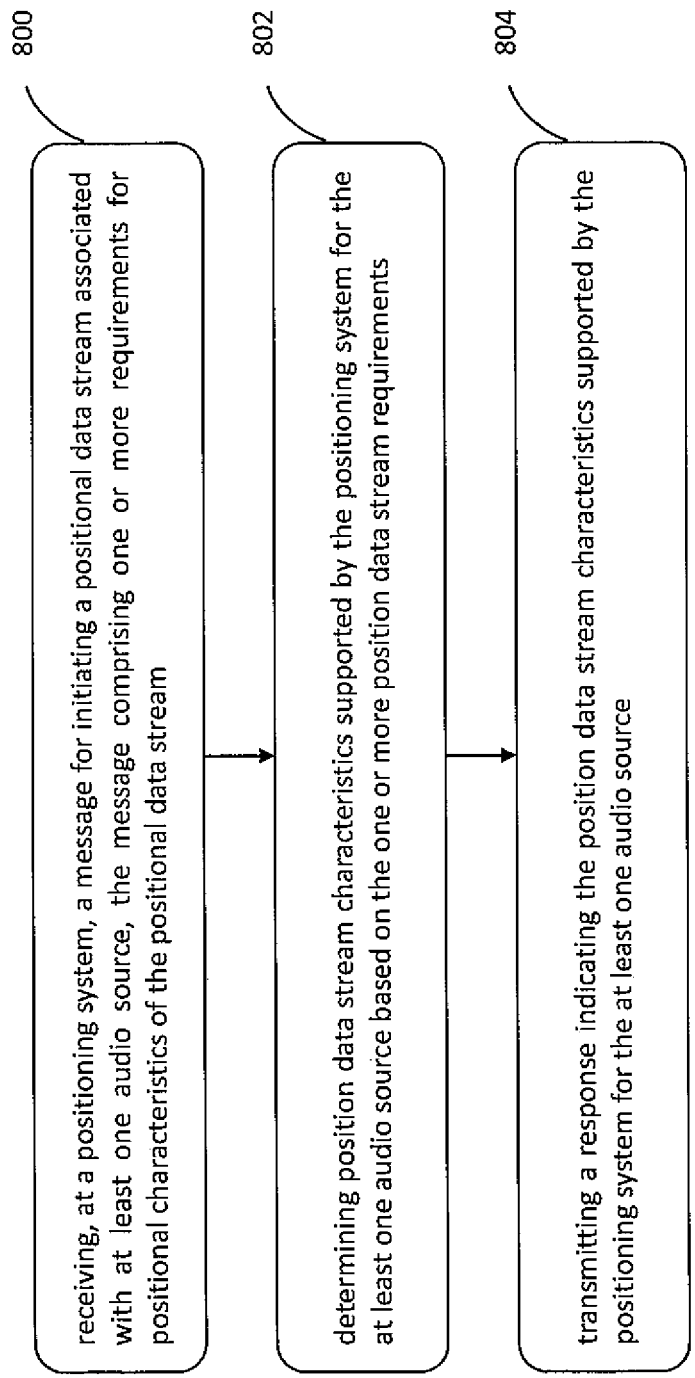
FIG. 8 is another logic flow diagram for position stream session negotiation, and illustrates the operation of an exemplary method, a result of execution of computer program instructions embodied on a computer readable memory, functions performed by logic implemented in hardware, and/or interconnected means for performing functions in accordance with exemplary embodiments.

FIG. 8 is a logic flow diagram for position stream session negotiation. This figure further illustrates the operation of an exemplary method, a result of execution of computer program instructions embodied on a computer readable memory, functions performed by logic implemented in hardware, and/or interconnected means for performing functions in accordance with exemplary embodiments. For instance, the positioning module 150-1 and/or 150-2 may include multiples ones of the blocks in FIG. 8, where each included block is an interconnected means for performing the function in the block. The blocks in FIG. 8 are assumed to be performed by the device 170 or 190, e.g., under control of the positioning module 150-1 and/or 150-2 at least in part.

In one example embodiment, a method may include: receiving, at a positioning system, a message for initiating a positional data stream associated with at least one audio source, the message comprising one or more requirements for positional characteristics of the positional data stream as indicated by block 800; determining position data stream characteristics supported by the positioning system for the at least one audio source based on the one or more position data stream requirements as indicated by block 802; and transmitting a response indicating the position data stream characteristics supported by the positioning system for the at least one audio source as indicated by block 804.

The method may include transmitting data corresponding to the at least one audio source from the positioning system in response to receiving an indication that the position data stream is initiated. The method may further comprise receiving, from the first device, a message to re-negotiate the position data stream characteristics; and select, by the second device, new position data stream characteristics based on the received message. The method may include determining a change in a movement characteristic of the at least one audio source occurs for longer than a predetermined threshold; and transmitting, from the positioning system, a message to re-negotiate the position data stream characteristics to account for the change. Determining the change in the movement characteristic may comprise tracking the at least one audio source based on one or more motion sensors. The one or more motion sensors may be at least one of: a gyroscope; an accelerometer; a compass; a barometer; and a proximity sensor.

Without in any way limiting the scope, interpretation, or application of the claims appearing below, a technical effect of one or more of the example embodiments disclosed herein is optimal utilization of positioning system resources for meeting application requirements. Another technical effect of one or more of the example embodiments disclosed herein is to provide a unified interface for professional audio over IP applications (since now both audio and position data arrives using the same session set up method). Another technical effect of one or more of the example embodiments disclosed herein is the IETF standards used in AES67 is leveraged. Another technical effect of one or more of the example embodiments disclosed herein is separating data transmission/routing from mixing in current SAM/DANTE set-up. Another technical effect of one or more of the example embodiments disclosed herein is enabling interfacing positioning systems, such as HAIP, to applications which need position streams. Another technical effect of one or more of the example embodiments disclosed herein is reduced manual workload for modifying and setting the positioning session parameters.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1. A computer-readable medium may comprise a computer-readable storage medium (e.g., memory 125 and 155 or other device) that may be any media or means that can contain, store, and/or transport the instructions for use by or in connection with an instruction execution system, apparatus, or device, such as a computer. A computer-readable storage medium does not comprise propagating signals.

Any combination of one or more computer readable medium(s) may be utilized as the memory. The computer readable medium may be a computer readable signal medium or a non-transitory computer readable storage medium. A non-transitory computer readable storage medium does not include propagating signals and may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
   at least one processor; and
   at least one non-transitory memory including computer program code, the at least one non-transitory memory and the computer program code configured, with the at least one processor, to cause the apparatus at least to:
      transmit, to a positioning system, a message for initiating a positional data stream associated with at least one audio source, the message comprising one or more requirements for positional characteristics of the positional data stream, wherein the message for initiating the positional data stream is transmitted as part of session initiation protocol session establishment, wherein the one or more requirements for positional characteristics are encoded as a session description protocol offer that is transmitted as part of the session initiation protocol session establishment, wherein the session description protocol offer comprises a position stream identifier identifying the at least one audio source;
      receive a response from the positioning system, wherein the response comprises:
         a position update frequency that the positioning system supports for the positional data stream, and
         one or more of the positional characteristics that the positioning system supports for the at least one audio source,
      where the supported position update frequency indicates a frequency with which data, corresponding to the at least one audio source, is capable of being received from the positioning system, where the supported position update frequency is based, at least partially, on one or more attributes of the positioning system that enable location of the at least one audio source, wherein the positioning system is configured to track the position of the at least one audio source; and
      initiate the positional data stream with the positioning system based on the received response.

2. The apparatus of claim 1, wherein the one or more attributes of the positioning system comprise at least one of:
   hardware of the positioning system;
   sensors of the positioning system; or
   processing resources of the positioning system.

3. The apparatus of claim 1, wherein initiation of the positional data stream comprises sending an acknowledgment to the positioning system, and wherein the at least one non-transitory memory and the computer program code are configured, with the at least one processor, to cause the apparatus at least to:
   receive the data, corresponding to the at least one audio source, from the positioning system via the initiated positional data stream.

4. The apparatus of claim 1, wherein the at least one non-transitory memory and the computer program code are configured, with the at least one processor, to cause the apparatus at least to:
   determine a change in a movement characteristic of the at least one audio source occurs for longer than a predetermined threshold; and
   transmit a further message to re-negotiate the positional characteristics to account for the change.

5. The apparatus of claim 4, wherein determination of the change in the movement characteristic comprises tracking the at least one audio source based on at least one of:
   analysis of frames captured with a camera; or
   microphone array derived spatial analysis.

6. The apparatus of claim 1, wherein the at least one non-transitory memory and the computer program code are configured, with the at least one processor, to cause the apparatus at least to:
   receive, from the positioning system, a message to re-negotiate the positional characteristics; and
   select new positional characteristics based on the received message.

7. The apparatus of claim 1, wherein the message for initiating the positional data stream comprises at least one of:
   one or more position update frequencies;
   one or more position data coordinate systems; or
   one or more position data attributes.

8. The apparatus of claim 7, wherein the one or more position data attributes comprises at least one of:
   azimuth,
   elevation, or
   distance.

9. The apparatus of claim 1, wherein the response from the positioning system indicates at least one of:
   a position data coordinate system the positioning system supports; or
   at least one position data attribute the positioning system supports.

10. The apparatus of claim 1, wherein the apparatus comprises the positioning system, and wherein the data, corresponding to the at least one audio source, is received over the positional data stream via a local socket with the positioning system.

11. The apparatus of claim 1, wherein the apparatus and the positioning system are connected via a network.

12. A method comprising:
   transmitting, to a positioning system, a message for initiating a positional data stream associated with at least one audio source, the message comprising one or more requirements for positional characteristics of the positional data stream, wherein the message for initiating the positional data stream is transmitted as part of session initiation protocol session establishment, wherein the one or more requirements for positional characteristics are encoded as a session description protocol offer that is transmitted as part of the session initiation protocol session establishment, wherein the session description protocol offer comprises a position stream identifier identifying the at least one audio source;
   receiving a response from the positioning system, wherein the response comprises:

a position update frequency that the positioning system supports for the positional data stream, and one or more of the positional characteristics that the positioning system supports for the at least one audio source, where the supported position update frequency indicates a frequency with which data, corresponding to the at least one audio source, is capable of being received from the positioning system, where the supported position update frequency is based, at least partially, on one or more attributes of the positioning system that enable location of the at least one audio source, wherein the positioning system is configured to track the position of the at least one audio source; and initiating the positional data stream with the positioning system based on the received response.

13. The method of claim 12, wherein the one or more attributes of the positioning system comprise at least one of:
hardware of the positioning system;
sensors of the positioning system; or
processing resources of the positioning system.

14. The method of claim 12, wherein initiating the positional data stream comprises sending an acknowledgment to the positioning system, and wherein the method further comprises:
receiving the data, corresponding to the at least one audio source, from the positioning system via the initiated positional data stream.

15. The method of claim 12, further comprising:
determining a change in a movement characteristic of the at least one audio source occurs for longer than a predetermined threshold; and
transmitting a further message to re-negotiate the positional characteristics to account for the change.

16. The method of claim 15, wherein determining the change in the movement characteristic comprises:
tracking the at least one audio source based on at least one of:
analysis of frames captured with a camera; or
microphone array derived spatial analysis.

17. The method of claim 12, further comprising:
receiving, from the positioning system, a message to re-negotiate the positional characteristics; and
selecting new positional characteristics based on the received message.

18. The method of claim 12, wherein the message for initiating the positional data stream comprises at least one of:
one or more position update frequencies;
one or more position data coordinate systems; or
one or more position data attributes.

19. A computer program product comprising a non-transitory computer-readable storage medium having computer program code embodied thereon which, when executed with an apparatus, causes the apparatus to perform:
transmitting, to a positioning system, a message for initiating a positional data stream associated with at least one audio source, the message comprising one or more requirements for positional characteristics of the positional data stream, wherein the message for initiating the positional data stream is transmitted as part of session initiation protocol session establishment, wherein the one or more requirements for positional characteristics are encoded as a session description protocol offer that is transmitted as part of the session initiation protocol session establishment, wherein the session description protocol offer comprises a position stream identifier identifying the at least one audio source;
receiving a response from the positioning system, wherein the response comprises:
a position update frequency that the positioning system supports for the positional data stream, and
one or more of the positional characteristics that the positioning system supports for the at least one audio source,
where the supported position update frequency indicates a frequency with which data, corresponding to the at least one audio source, is capable of being received from the positioning system, where the supported position update frequency is based, at least partially, on one or more attributes of the positioning system that enable location of the at least one audio source, wherein the positioning system is configured to track the position of the at least one audio source; and
initiating the positional data stream with the positioning system based on the received response.

\* \* \* \* \*